United States Patent [19]

Marmonier et al.

[11] 3,996,101
[45] Dec. 7, 1976

[54] DEVICE FOR SUPPORTING A FUEL PIN CLUSTER WITHIN A NUCLEAR REACTOR FUEL ASSEMBLY WRAPPER

[75] Inventors: Pierre Marmonier; Bernard Mesnage; Jean Teulon; Jean Vayra, all of Aix-En-Provence; Henri Venobre, Vinon-sur-Verdon, all of France

[73] Assignee: Commissariat a l'Energie Atomique, Paris, France

[22] Filed: Mar. 11, 1975

[21] Appl. No.: 557,312

[30] Foreign Application Priority Data

Mar. 28, 1974 France .............................. 74.10905

[52] U.S. Cl. ............................... 176/78; 176/79; 176/81
[51] Int. Cl.$^2$ ......................................... G21C 3/30
[58] Field of Search .................. 176/78, 81, 79, 76

[56] References Cited
UNITED STATES PATENTS

| | | | |
|---|---|---|---|
| 3,158,549 | 11/1964 | Fowler ................................. | 176/78 |
| 3,743,578 | 7/1973 | Agranier et al. ................. | 176/76 X |
| 3,755,077 | 8/1973 | Agranier et al. ................. | 176/76 X |
| 3,764,471 | 10/1973 | Ripley ............................ | 176/76 X |
| 3,816,248 | 6/1974 | Cayol et al. ...................... | 176/76 X |
| 3,857,755 | 12/1974 | Kinzer ............................. | 176/79 X |
| 3,862,884 | 1/1975 | Jabsen ............................. | 176/78 |
| 3,890,197 | 6/1975 | Butts et al. ..................... | 176/78 |

FOREIGN PATENTS OR APPLICATIONS 862,208  3/1961  United Kingdom ................ 176/78

*Primary Examiner*—Verlin R. Pendegrass
*Assistant Examiner*—Peter A. Nelson
*Attorney, Agent, or Firm*—Cameron, Kerkam, Sutton, Stowell & Stowell

[57] ABSTRACT

A supporting member for an array of parallel rails each carrying one row of slidably mounted pins of a fuel cluster is placed coaxially at the lower end of a vertical fuel assembly wrapper. Each parallel rail is provided at each end with a downward extension and terminal lug which engages in a lateral groove formed in the periphery of the supporting member in order to lock and maintain the rails and the fuel pins in uniformly spaced relation within the fuel assembly wrapper.

10 Claims, 8 Drawing Figures

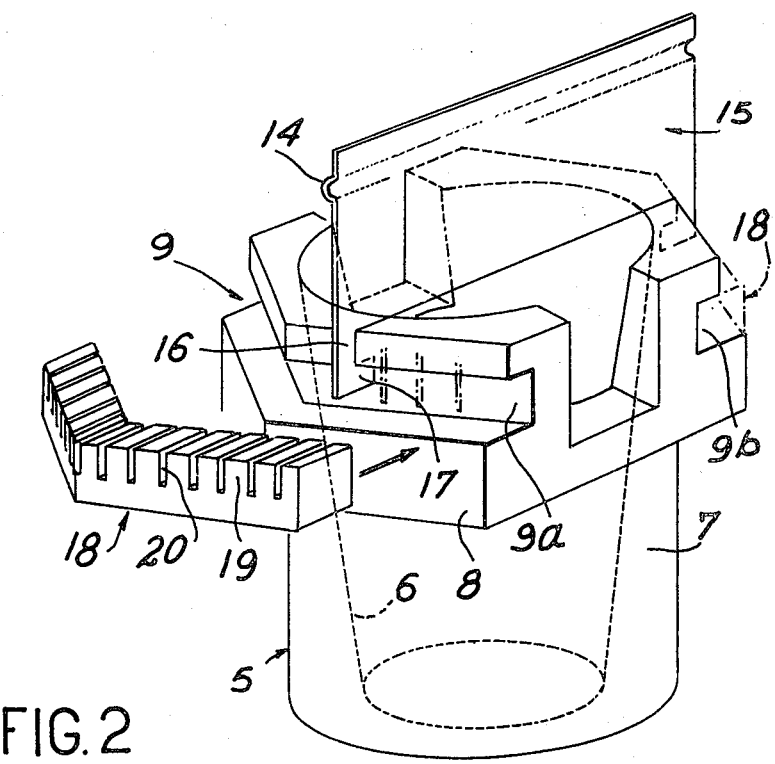
FIG.2
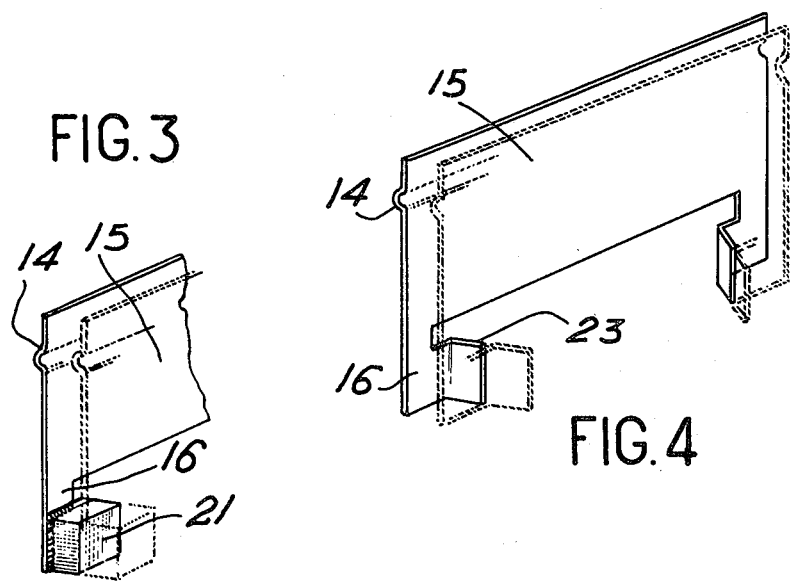
FIG.3
FIG.4

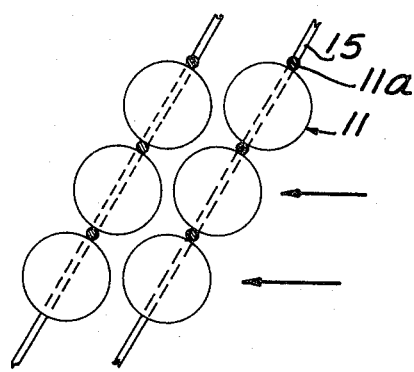
FIG. 5a
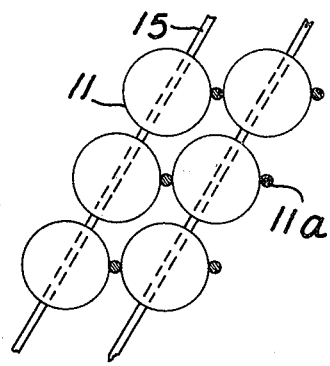
FIG. 5b
FIG. 6
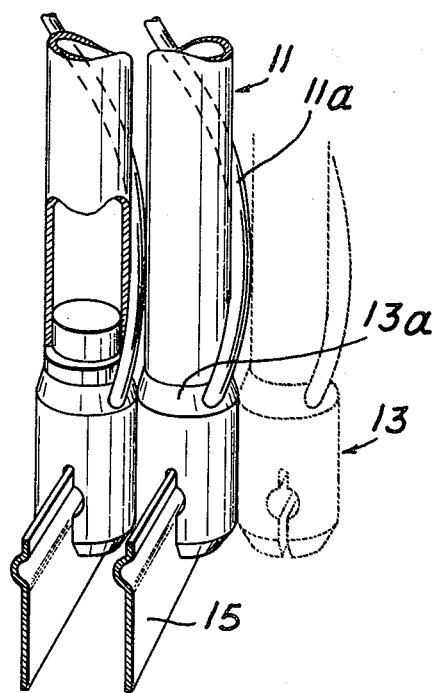
FIG. 7
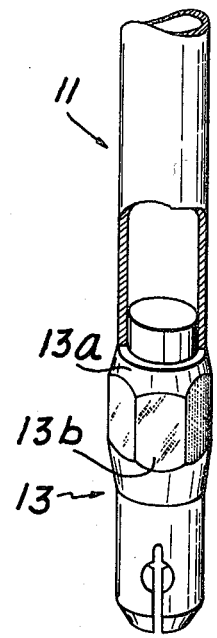

DEVICE FOR SUPPORTING A FUEL PIN CLUSTER WITHIN A NUCLEAR REACTOR FUEL ASSEMBLY WRAPPER

This invention relates to a device for supporting and positioning the parallel pins of a fuel cluster with respect to each other. These pins are usually provided in the form of pencils of fissile or fertile fuel material each provided with an external cladding or stainless steel. Said fuel cluster is placed vertically within a casing or so-called wrapper of polygonal cross-sectional which is open at the top end and provided with a bottom end-fitting. The complete assembly constituted by the wrapper and the cluster of pins contained in said wrapper is usually referred-to as a fuel asembly.

It is known that the core of a nuclear reactor and especially a fast reactor is constituted by an array of fuel assemblies of this type in juxtaposed relation and supported by a diagrid consisting of a support plate provided with apertures in which are engaged the end-fittings of said fuel assemblies so that these latter can thus extend vertically. The fuel assemblies are cooled during reactor operation by continuous circulation of a liquid metal usually consisting of sodium which penetrates into said assemblies through their end-fittings beneath the diagrid and flows upwards within the wrappers in contact with the fuel-pin clusters which are surrounded by said wrappers. In consequence, the pins must be suitably locked in position within their respective wrappers, particularly in order to be maintained in parallel relation, to delimit suitable cross-sectional areas for the flow of coolant between the pins with a view to ensuring uniform cooling of the cluster and finally to prevent mechanical vibrations produced by the flow of liquid sodium.

One expedient which has already been contemplated for attaching and locking the pins of a fuel cluster within a fuel assembly wrapper consists in supporting the pins on an internal grid carried by the wrapper above the corresponding end-fitting or by a circular ring secured to this latter. For the purpose of mounting the assembly, it is necessary in this case to insert each pin in the grid one by one, which constitutes a difficult and time-consuming operation. In an improvement to the arrangements mentioned above, especially as described in U.S. Pat. No. 3,743,578 issued in the name of Commissariat a l'Energie Atomique in respect of "Device for attaching nuclear fuel pins in an assembly", it has also been proposed to form the device under consideration by means of at least two parallel rods, said rods being secured to a support which is rigidly fixed to the wrapper casing and being placed transversely to the direction of flow of the coolant, and by means of parallel rails placed at right angles to the rods and capable of sliding along these latter, said rails being also capable of sliding within the end-caps of a row of pins in order to retain these latter.

In the design solution just mentioned, experience has shown that it can be desirable to add to the fastening device consisting of rods and parallel rails at least one lateral locking member in the form of a comb which is intended to be placed above the support and beneath the rails, the teeth of said comb being capable of engaging between the successive rails so as to lock these latter onto the rods with a predetermined spacing which is maintained at a substantially identical value during operation of the reactor.

This invention relates to a novel improvement to a fastening and supporting device of the type recalled in the foregoing which ensures more effective locking of the rails, easier mounting of the fuel assembly within the wrapper and more straightforward manufacture.

To this end, the device under consideration comprises a supporting member placed coaxially at the lower end of the vertically-disposed fuel assembly wrapper for a series of parallel rails on the upper extremities of which are slidably engaged grooves formed in the end-caps of a row of pins of the fuel cluster, said device being distinguished by the fact that the supporting member has a lateral groove which is open towards the periphery of said supporting member and cooperates with fastening lugs forming lateral extensions of the rails and each having a re-entrant portion which engages in the groove.

In accordance with another characteristic feature, each rail is provided with two fastening lugs disposed in the plane of the rail, the re-entrant portion of each lug being engaged in two regions of the groove which are located on each side of a plane of symmetry at right angles to the plane of the rail and passing through the axis of the fuel assembly wrapper.

The spacing between the parallel rails is preferably fixed by locking means adapted to penetrate into the groove within the space which separates two successive re-entrant portions of two adjacent rails. Depending on requirements, said locking means can be constituted by combs mounted within the groove beneath the fastening lugs of the rails and having teeth engaged between the lugs. In an alternative form of construction, these means are constituted by blocks or the like which are each secured to one face of a rail or, by way of alternative, are independent of the rails at the time of assembly and either welded or brazed onto said rails once these latter have been engaged within the groove.

In another form of construction, the spacing between the parallel rails is fixed by means which are directly attached to the pins of the cluster and ensure constant spacing between a row of pins carried by one rail and a row of pins carried by one of the adjacent parallel rails. Depending on requirements, the spacing means are constituted by wires which are each wound in a helix of constant pitch on the external surface of each fuel pin and secured at one end to the end-cap of said pin, the point of initial attachment of the wire of each pin being displaced by 60° about the axis of the pin with respect to the plane of the groove which is slidably fitted on the rail. Alternatively, the spacing means can consist of an overthickness of the end-cap so that the end-caps of one row of pins are in contact with the end-caps of the adjacent row. These overthicknesses of end-caps can have either a cylindrical or prismatic profile.

Further properties of a supporting device as constructed in accordance with the invention will become apparent from the following description in connection with a number of examples of execution which are given by way of indication without any limitation being implied, reference being made to the accompanying drawings, wherein:

FIG. 2 is a detail view to a larger scale showing a locking member which can be associated with the device shown in FIG. 1;

FIGS. 3 and 4 are also views to a larger scale showing two further alternative forms of construction of the locking member;

FIGS. 5a and 5b illustrate respectivey a conventional arrangement and an alternative form of construction in which the spacing between the parallel rails is obtained directly by the fuel pins themselves, the end-caps of which are slidably engaged on said rails;

FIGS. 6 and 7 illustrate two further forms of construction derived from that shown in FIG. 5b.

Figure 1:
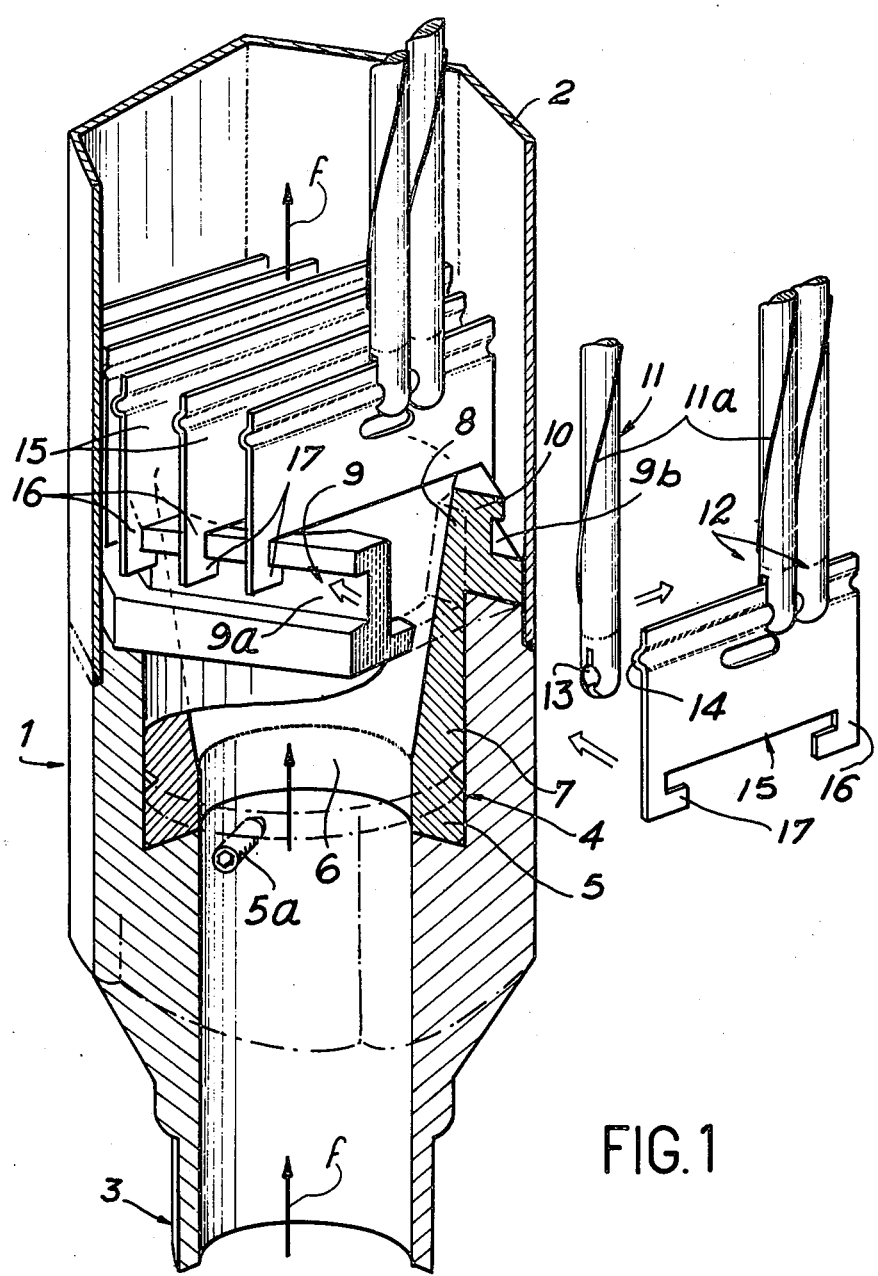
FIG. 1 is a partly exploded view in perspective showing a nuclear reactor fuel assembly wrapper which comprises a device in accordance with the invention for supporting the fuel pin cluster.

In FIG. 1, the reference 1 designates diagrammatically a portion of a fissile or fertile fuel assembly, especially for a fast reactor. In a manner which is conventional in itself, said assembly is constituted by an external wrapper 2 having a cross-section in the shape of a regular polygon and especially a hexagon. Said wrapper 2 is preferably formed of stainless steel and has an extension at the lower end in the form of a positioning end-fitting 3 which is shown partially in the figure and serves to maintain the wrapper in the vertical position when this latter is placed within the reactor core. In the drawing, the arrows f represent the direction in which a coolant liquid usually consisting of sodium circulates within the reactor core through the fuel assembly 1. Said coolant thus flows through the bottom end-fitting 3 and the wrapper 2 towards the top of the fuel assembly.

There is mounted within the interior of the wrapper 2 a member 4 for supporting the cluster of fissile or fertile fuel pins described hereinafter. Said supporting member 4 comprises at the lower end thereof a ring 5 which is stationarily fixed with respect to the wrapper 2 by means of screws 5a disposed at angular intervals of 120° about the common axis of the ring 5 and of the wrapper 2. Said ring 5 has a central bore 6 for the flow of coolant sodium and has an extension towards the upper portion of the wrapper in the form of a cylindrical-conical sleeve 7 provided at the upper extremity with a tubular member 8 which is joined on the one hand to the sodium circulation bore 6 and is provided on the other hand with a polygonal external contour which closely conforms to the internal profile of the wrapper 2.

In accordance with the invention, the member 8 is provided in its external surface with an open groove 9 which is formed along the entire periphery of the member 8. Alternatively, in the case in which the tubular member is mounted within a wrapper having a hexagonal cross-section, the groove forms two diametrically opposite half-grooves 9a and 9b each extending along two consecutive sides of the cross-sectional hexagon. Said groove 9 is delimited at the top by a flat flange 10 extending in the direction of the internal surface of the wrapper but over a distance which is slightly shorter than the body of the member 8 itself.

The fuel assembly wrapper 2 surrounds a cluster of fuel pins 11, the constructional detail of which has little direct bearing on the invention. In accordance with known practice, the fuel pins 11 each have an external can especially of steel which is closed at both ends by end-caps 12. Each end-cap has a transverse slot or groove 13 for positioning said pins 11 in rows of parallel pins by engaging these latter on a rib 14 of a rail 15. The complete pin cluster thus calls for use of a series of rails 15 which are parallel to each other and each intended to carry one row of pins, the slot 13 of each pin being engaged on the rail and capable of sliding on the corresponding rib 14, the spacing of the pins in each row being ensured by means of a wire 11a which is helically wound on the external surface of the can of each pin.

In order to ensure that the pins 11 are supported and locked in position by means of the tubular member 8 within the interior of the wrapper 2 while at the same time maintaining said pins in position by means of the rails 15, each rail has two lateral lugs 16 which extend within the space left free between the wrapper 2 and the flange 10 and terminate in a re-entrant portion 17 which is capable of engaging within the groove 9 beyond said flange 10. The result thereby achieved is that the cooperation of said re-entrant portion 17 and the groove 9 makes it possible to lock the rails 15 in position in the vertical direction and consequently the pins 11 which are supported by said rails. Furthermore and in accordance with an advantageous arrangement, the parallel rails 15 which have been placed in position with respect to the groove 9 in the manner described above are mounted in position by means of a locking member. Various forms of construction of said locking members are illustrated in FIGS. 2 to 4.

In the case illustrated in FIG. 2, the locking of the rails 15 which carry the fuel pins 11 is carried out by means of two combs 18 engaged in the two half-grooves 9a and 9b which are machined in the tubular member 8 in diametrically opposite relation. Each comb 18 has teeth 19 separated from each other by slots 20 which are directed towards the top of the wrapper 2 and the plane of which corresponds to that of the rails 15. Under these conditions, the engagement of the comb 18 between the rails 15 and positioning of these latter within the slots 20 between the teeth 19 has the effect of locking all the rails in position with respect to the tubular member 8 and consequently with respect to the fuel assembly wrapper.

In the alternative form of construction which is illustrated in FIG. 3, each rail 15 is associated with a lateral block 21 which is placed within the space formed between two adjacent rails. Depending on requirements, said blocks 21 can either be secured with respect to the rails by welding or brazing prior to assembly or be placed in position after engagement of the rails within the groove 9, said blocks being thus fixed on the rails only on completion of the assembly operation. In another alternative form of construction which is illustrated by way of example in FIG. 4, the re-entrant portion 17 of each rail 15 which penetrates into the groove 9 can be provided with a transverse strip or tongue 23 which serves as a distance-piece between two adjacent rails and therefore performs a function which is identical to that of the blocks 21 of FIG. 3.

FIG. 5a is a view taken in cross-section at right angles to the axis of the pins and illustrates a portion of the fuel cluster in which the end-cap of each pin 11 is engaged on the rails 15 as already explained in detail. It is apparent in this case, however, that if the rails themselves are not locked in position with respect to the supporting member, displacements and vibrations are liable to take place in the direction of the arrows and consequently to affect the geometry of the fuel cluster. In order to circumvent this drawback, it is possible in accordance with an arragement illustrated in FIG. 5b to maintain relative spacing of the fuel pins in adjacent rows and consequently to lock the rails which support said pins by displacing each wire 11a through an angle of 60° about the fuel-pin axis with respect to its point of attachment to the end-cap, thereby ensuring that the wires serve to space the pins not only in each row but also from one row to the next. In the alternative form shown in FIG. 6, spacing of the fuel pins is carried out directly at the level of the end-caps 13 by giving these latter an overthickness 13a, thus ensuring mutual contact of the pins in the adjacent rows. Finally in FIG. 7, the overthickness 13a of the end-cap 13 has a prismatic profile with cantfaces 13b.

There is thus provided a device for supporting a fuel-pin cluster which is of very simple design and has an advantage over known designs in that any potential causes of sodium flow disturbance are limited, especially as a result of a more favorable distribution of mechanical stresses, this advantage being more appreciable as the weight of the fuel pins is greater.

It remains readily apparent that the invention is not limited to the examples of construction which have been more especially described with reference to the accompanying drawings but is intended to include all alternative forms of construction within its scope. In particular, apart from the above-mentioned application to a fissile or fertile fuel assembly, the invention also applies to a control assembly constituted by a cluster of pins containing neutron-absorbing materials, such pins being placed within a vertical which is similar to the wrappers of reactor core fuel assemblies.

What we claim is:

1. A device for supporting a cluster of fuel pins having end caps within the wrapper of a nuclear reactor fuel assembly comprising a coaxial supporting member at the lower end of the vertically-disposed fuel assembly wrapper, a plurality of parallel rails, grooves formed in the lower end-caps of a row of pins of the fuel cluster slidably engaged on the upper extremities of said rails, a lateral groove in and opening towards the periphery of said supporting member, fastening lugs forming lateral extensions of said rails, a re-entrant portion for each of said lugs mounted in said groove, said two fastening lugs for each of said rails being disposed in the plane of said rails, said re-entrant portions of said lugs for each of said rails engaging in two regions of said groove located on each side of a plane of symmetry at right angles to the plane of said rail and passing through the axis of the fuel assembly wrapper, locking means fixing the spacing between said parallel rails and extending into said groove within a space separating adjacent ones of said re-entrant portions of two adjacent rails.

2. A supporting device according to claim 1, said locking means including combs within said groove beneath said fastening lugs of the rails and teeth for said combs engaged between said lugs.

3. A supporting device according to claim 1, said locking means including blocks secured to one face of a rail.

4. A supporting device according to claim 1, including means for spacing said parallel rails directly attached to the pins of the cluster and providing constant spacing between a row of pins carried by one rail and a row of pins carried by one of the adjacent parallel rails.

5. A device for supporting a cluster of fuel pins having end caps within the wrapper of a nuclear reactor fuel assembly comprising a coaxial supporting member at the lower end of the vertically-disposed fuel assembly wrapper, a plurality of parallel rails, grooves formed in the lower end-caps of a row of pins of the fuel cluster slidably engaged on the upper extremities of said rails, a lateral groove in and opening towards the periphery of said supporting member, fastening lugs forming lateral extensions of said rails, a re-entrant portion for each of said lugs mounted in said groove, said two fastening lugs for each of said rails being disposed in the plane of said rail, said re-entrant portions of said lugs for each of said rails engaging in two regions of said groove located on each side of a plane of symmetry at right angles to the plane of said rail and passing through the axis of the fuel assembly wrapper; and means for spacing said parallel rails directly attached to the pins of the cluster and providing constant spacing between a row of pins carried by one rail and a row of pins carried by one of the adjacent parallel rails.

6. A supporting device according to claim 5, said spacing means including wires each wound in a helix of constant pitch on an external surface of a fuel pin and secured at one end to and at the level of the lower end-cap of said pin, the point of initial attachment of the wire of each pin being displaced by 60° about the axis of said pin.

7. A supporting device according to claim 5, said spacing means including an overthickness of the lower end-cap of each of said pins so that the end-caps of one row of pins are in contact with the end-caps of the adjacent row of pins.

8. A supporting device according to claim 7, wherein the overthickness of the end-caps each have a cylindrical profile.

9. A supporting device according to claim 7 wherein the overthickness of the end-caps each have a prismatic profile.

10. A supporting device according to claim 1 said locking means including blocks adjacent one face of the rails and connected to the rails when the rails are in said groove.

* * * * *